United States Patent
Wu et al.

(10) Patent No.: US 8,625,260 B2
(45) Date of Patent: Jan. 7, 2014

(54) SLIDING MODULE FOR ELECTRONIC DEVICE

(75) Inventors: Ke-Long Wu, Shenzhen (CN); Chao Duan, Shenzhen (CN); Chia-Hua Chen, Shindian (TW)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 361 days.

(21) Appl. No.: 13/176,338

(22) Filed: Jul. 5, 2011

(65) Prior Publication Data

US 2012/0170184 A1    Jul. 5, 2012

(30) Foreign Application Priority Data

Dec. 31, 2010 (CN) .......................... 2010 1 0618372

(51) Int. Cl.
*H05K 5/00* (2006.01)

(52) U.S. Cl.
USPC ..... 361/679.01; 403/81; 248/121; 248/286.1; 248/157; 248/688

(58) Field of Classification Search
USPC ............. 361/679.01; 403/81; 248/121, 286.1, 248/157, 688, 278.1, 611
See application file for complete search history.

(56) References Cited

U.S. PATENT DOCUMENTS

| | | | | |
|---|---|---|---|---|
| 8,493,725 | B2* | 7/2013 | Wu et al. ................ | 361/679.27 |
| 8,514,556 | B2* | 8/2013 | Huang et al. ............ | 361/679.21 |
| 8,520,371 | B2* | 8/2013 | Peng et al. .............. | 361/679.01 |
| 2010/0027201 | A1* | 2/2010 | Wang et al. ............. | 361/679.01 |
| 2010/0073854 | A1* | 3/2010 | Jeong et al. ............. | 361/679.01 |
| 2010/0214743 | A1* | 8/2010 | Huang et al. ............ | 361/692 |
| 2012/0293927 | A1* | 11/2012 | Duan et al. ............. | 361/679.01 |
| 2012/0308296 | A1* | 12/2012 | Li et al. .................. | 403/81 |

* cited by examiner

*Primary Examiner* — Forrest M Phillips
(74) *Attorney, Agent, or Firm* — Altis Law Group, Inc.

(57) ABSTRACT

A sliding module includes a first section, a second section, a sliding member, a connecting plate, a rotary plate and an elastic member. The sliding member is rotatably connected to the first section. One end of the connecting plate slidably connected to the sliding member, and the other end of the connecting plate is rotatably connected to the second section. The rotary plate is respectively rotatably connected to the first section and the second section. One end of the elastic member is fixed to the second section, and the other end of the elastic member is fixed to the sliding member. When the sliding member slides relative to the second section and drives the connecting plate to rotate, the rotary plate rotates relative to the second section and causes the first section to move and rotate relative to the second section into a tilted orientation.

10 Claims, 6 Drawing Sheets

SLIDING MODULE FOR ELECTRONIC DEVICE

CROSS-REFERENCE TO RELATED APPLICATIONS

The present application is related to co-pending U.S. patent application Ser. No. 13/176,334, each entitled "SLIDING MODULE FOR ELECTRONIC DEVICE", by Wu et al. These applications have the same assignee as the present application and have been concurrently filed herewith. The above-identified applications are incorporated herein by reference.

BACKGROUND

1. Technical Field

The present disclosure generally relates to electronic devices, and particularly to a sliding module for an electronic device.

2. Description of Related Art

Portable electronic devices such as mobile phones, laptops, and personal digital assistants (PDAs) are widely used. As such, the sales and use of slide-type portable electronic devices have been on the increase. A slide-type portable electronic device has two housings, of which one slides relative to the other by a slide mechanism to open/close the portable electronic device.

However, the slide-type portable electronic devices typically only allows the two housings to slide parallel to each other. Therefore, when the slide-type portable electronic device is placed horizontally, it can be difficult for users to view a display screen on the housing.

Therefore, there is room for improvement within the art.

BRIEF DESCRIPTION OF THE DRAWINGS

Many aspects of the tilt mechanism for electronic device can be better understood with reference to the following drawings. The components in the drawings are not necessarily to scale, the emphasis instead being placed upon clearly illustrating the sliding module for electronic device. Moreover, in the drawings, like reference numerals designate corresponding parts throughout the several views.

DETAILED DESCRIPTION

Figure 1:
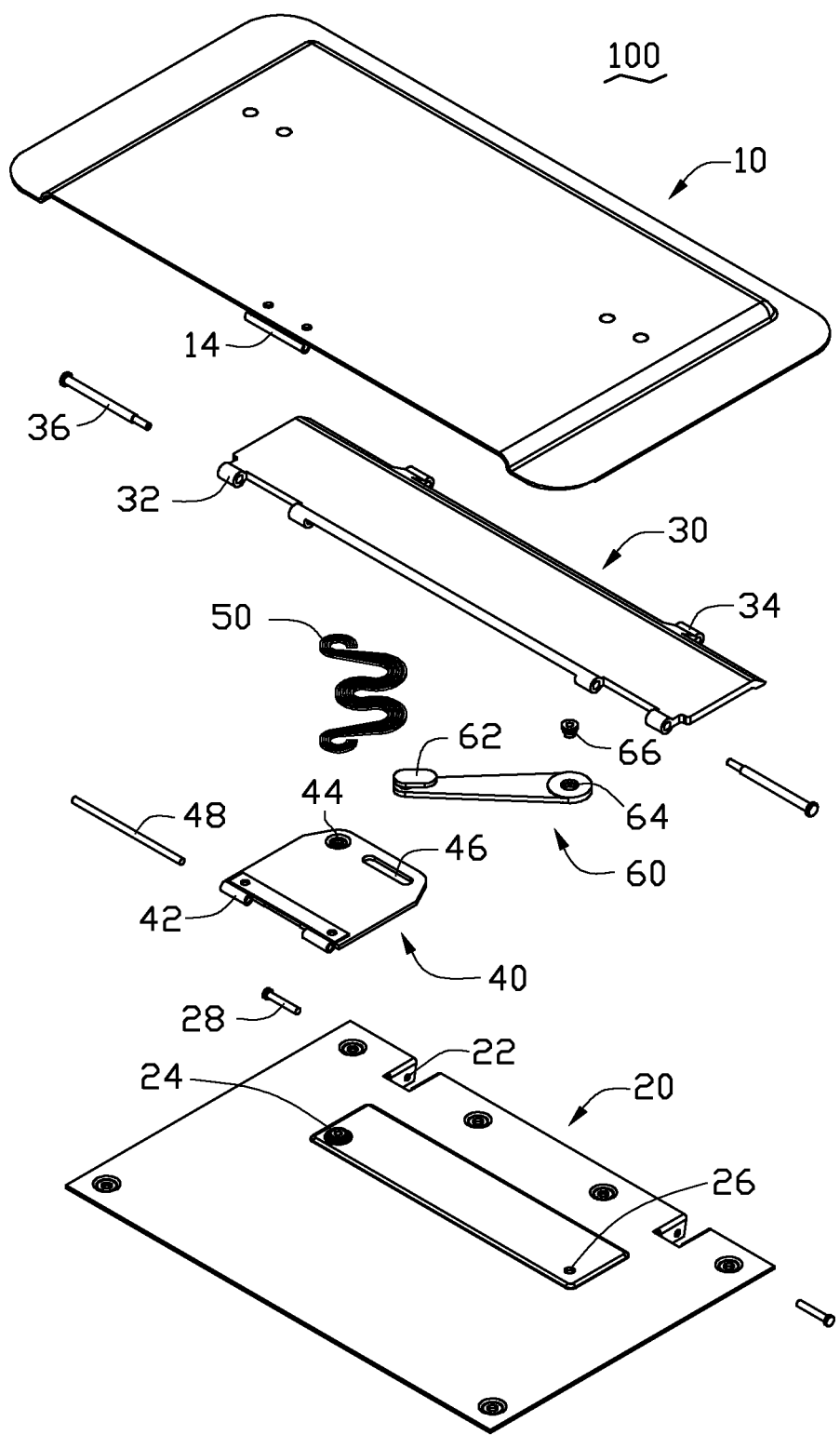
FIG. 1 is an exploded, isometric view of a sliding module according to an exemplary embodiment.
Figure 2:
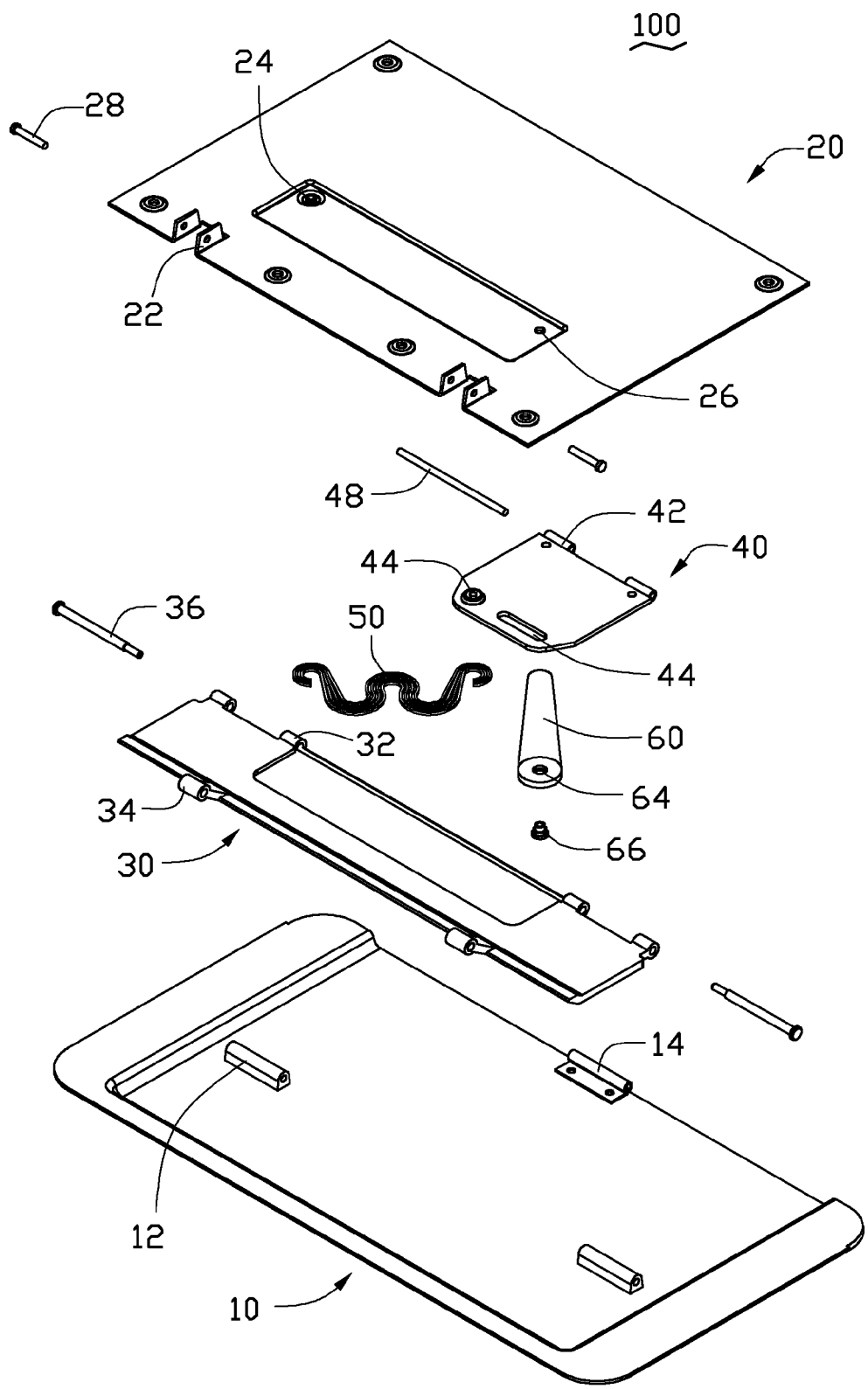
FIG. 2 is similar to FIG. 1, but shown from another angle.

FIG. 1 and FIG. 2 show an exemplary embodiment of a sliding module 100 applied in an electronic device, such as a mobile phone, or a personal digital assistant. The sliding module 100 can be in a flat, closed orientation and a tilted, open orientation. The sliding module 100 includes a first section 10, a second section 20, a rotary plate 30, a sliding member 40, an elastic member 50, and a connecting plate 60. In the flat, closed orientation, the first section 10 and the second section 20 overlap each other. In the tilted, open orientation, the second section 20 tilts relative to the first section 10 for better viewing.

Referring to FIG. 2, at least one pivot seat 12 is formed on a surface of the first section 10 for connecting the rotary plate 30. In this exemplary embodiment, the first section 10 has two pivot seats 12 at opposite sides of the surface thereof. The pivot seats 12 are rotatably connected to one side of the rotary plate 30. The first section 10 has a connecting portion 14 at one side thereof for rotatably connecting the sliding member 40.

At least one pair of hinge tabs 22 is formed on the second section 20 for connecting the rotary plate 30. In this exemplary embodiment, the second section 20 has two pairs of hinge tabs 22 for connecting the other side of the rotary plate 30. A Pin 24 and a receiving hole 26 are provided on the second section 20. The pin 24 is connected to one end of the elastic member 50. The receiving hole 26 is connected to one end of the connecting plate 60.

The rotary plate 30 includes two first hinged portions 32 and two second hinged portions 34 formed at opposite sides thereof. The first hinged portions 32 are connected to the pivot seats 12 with shafts 36. The second hinged portions 34 are connected to the hinge tabs 22 with shafts 28.

The sliding member 40 includes two fixed portions 42 at one side thereof. Each fixed portion 42 is rotatably connected to the connecting portion 14 with a shaft 48. A pin 44 is formed on the sliding member 40. A guiding slot 46 is defined in the sliding member 40 adjacent to the pin 44. The pin 44 is connected to the other end of the elastic member 50. The guiding slot 46 is connected to the other end of the connecting plate 60.

The elastic member 50 may be, e.g., a wire spring, a pressure spring, a torsion spring, or a spring plate, etc. In this exemplary embodiment, the elastic member 50 is substantially W-shaped. One end of the elastic member 50 is mounted to the pin 24 of the first section 10, and the other end of the elastic member 50 is mounted to the pin 44 of the sliding member 40. Thus, the elastic springs 50 connect the first section 10 and the sliding member 40.

The connecting plate 60 is connected to the sliding member 40 and the second section 20. One block 62 is formed on one end of the connecting plate 60. The block 62 is slidably engaged in the guiding slot 46. A pivot hole 64 is defined at the other end of the connecting plate 60. A pivot post 66 is inserted into the pivot hole 64 and the receiving hole 26 to rotatably connect the connecting plate 60 to the second section 20.

In assembly, the sliding member 40 and the connecting plate 60 are placed on the second section 20. The pivot hole 64 of the connecting plate 60 is connected to the receiving hole 26 of the second section 20 with the pivot post 66. The block 62 is slidably received in the guiding slot 46 of the sliding member 40. One end of the elastic member 50 is mounted to a pin 24 of the first section 10, and the other end of each elastic spring 50 is mounted to a pin 44 of the sliding member 40. The first hinged portions 32 of the rotary plate 30 are connected to the pivot seats 12 of the first section 10 with the shafts 36. The second hinged portions 34 are connected to the hinge tabs 22 with the shafts 28. The fixed portions 42 are rotatably connected to the connecting portion 14 of the first section 10 with the shaft 48. Accordingly, the sliding module 100 is assembled.

Figure 3:
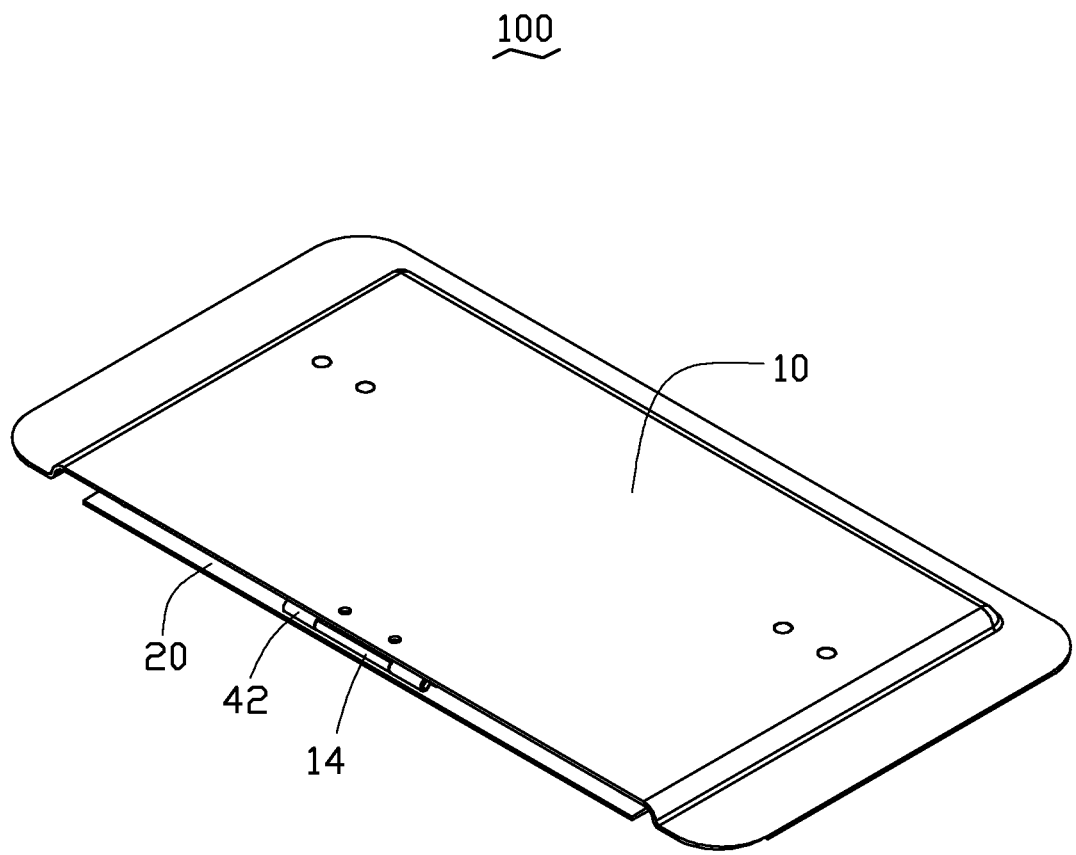
FIG. 3 is an isometric view of the sliding module of FIG. 1 in a flat, closed orientation.

Referring to FIG. 3, when the sliding module 100 is in a flat, closed orientation, the second section 20 overlaps the first section 10. Under the limitation of the first section 10 and the connecting plate 60, the rotary plate 30 cannot rotate.

Figure 4:
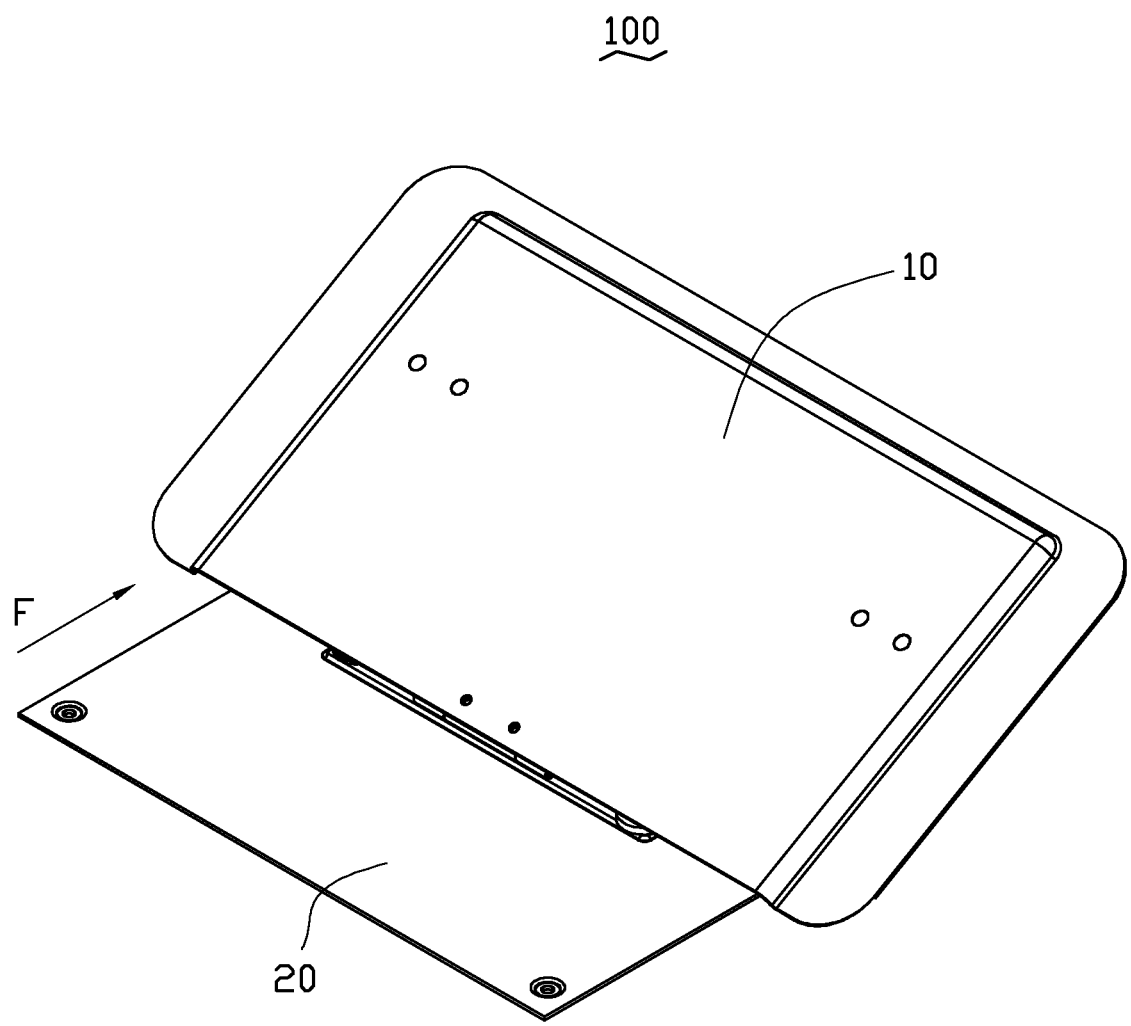
FIG. 4 is an isometric view of the sliding module of FIG. 3 in an open orientation.
Figure 5:
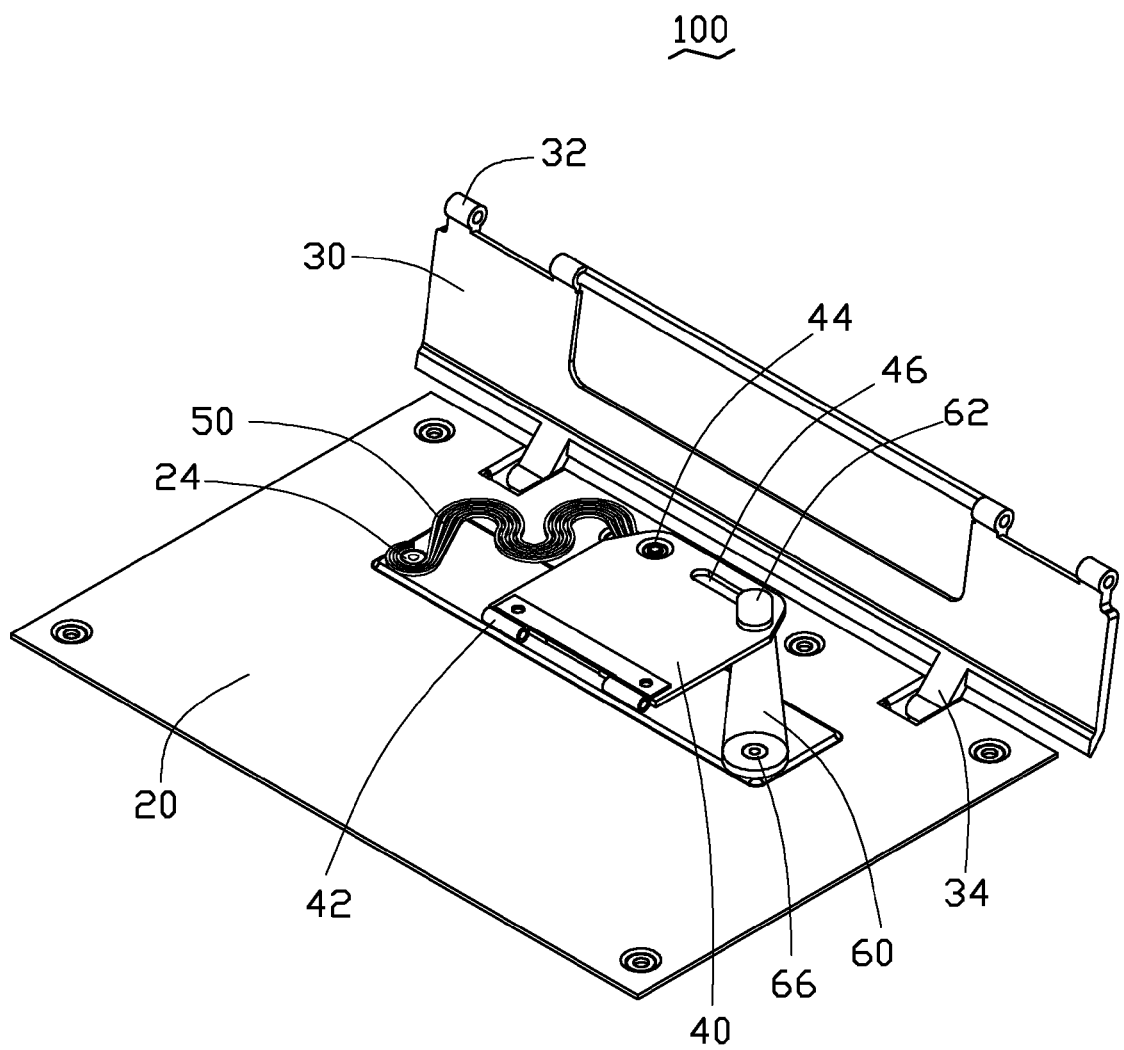
FIG. 5 is an isometric view of the sliding module of FIG. 4 omitting a first section.

Referring to FIGS. 4 and 5, when the sliding module 100 is opened, a force F is applied to the first section 10 and the sliding member 40 to move the first section 10 away from the second section 20. One end of the connecting plate 60 rotates around the pivot shaft 66 under the role of the sliding member 40, the block 62 of the connecting plate 60 moves from one end of the guiding slot 46. The sliding member 40 and the first section 10 slide relative to the second section 20, the rotary plate 30 will rotate along the second hinged portion 34 to elevate the first section 10. The elastic member 50 accumulates elastic energy until the sliding member 40 slides to a position where the elastic member 50 is compressed to a maximized deformation. After that, the sliding member 40 can further automatically slide towards the open position by returning the elastic member 50 from their compressed states to their original states. When the block 62 moves to the other end of the guiding slot 46, the first section 10 is supported in a tilted position relative to the second section 20.

Figure 6:
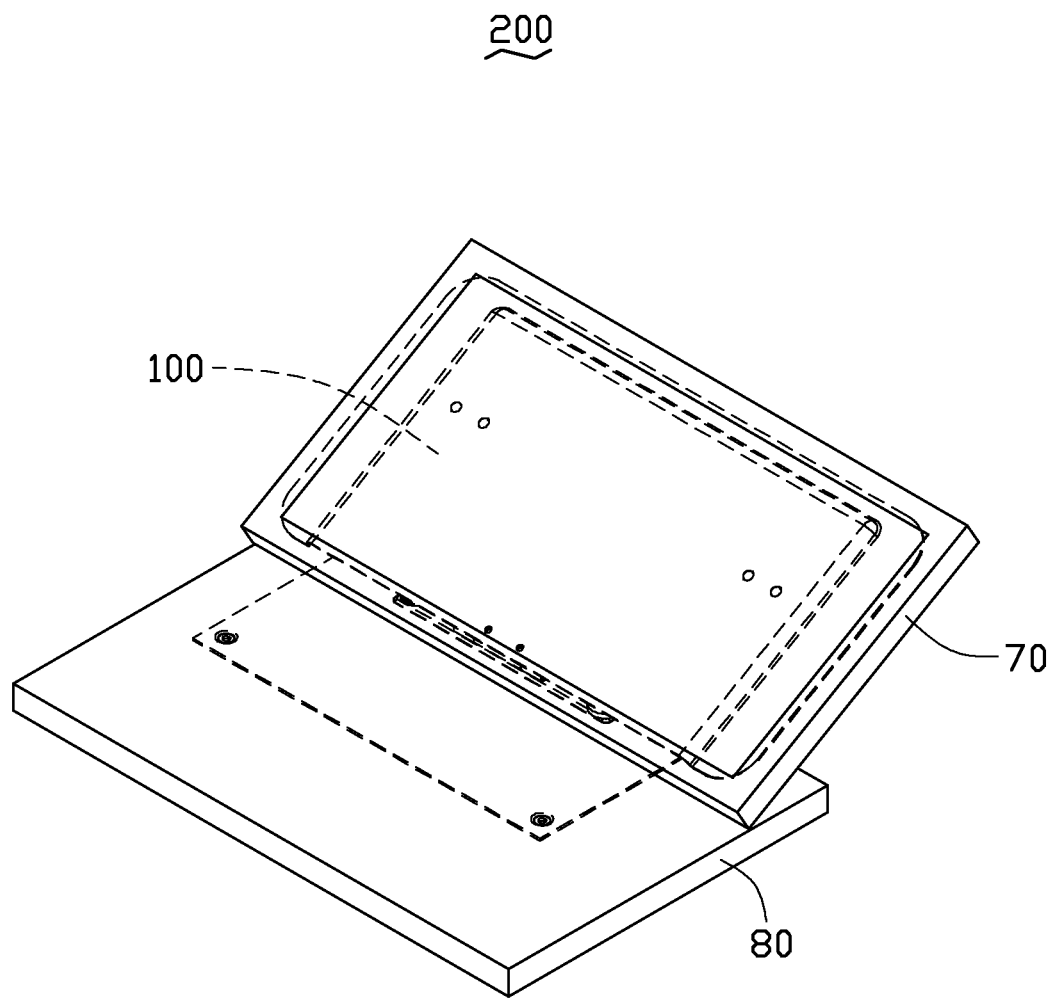
FIG. 6 is an isometric view of the sliding module applied in an electronic device.

Referring to FIG. 6, the sliding module 100 is applied in a portable electronic device 200 such as a mobile phone. The electronic device 200 includes a cover 70 and a housing 80 engageable with the cover 70. The cover 70 is secured to the first section 10, and the housing 80 is secured to the second section 20. Thus, the portable electronic device 200 opens or closes with the sliding module 100.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A sliding module comprising:
   a first section;
   a second section;
   a sliding member rotatably connected to the first section;
   a connecting plate, one end of the connecting plate slidably connected to the sliding member, and the other end of the connecting plate rotatably connected to the second section;
   a rotary plate respectively rotatably connected to the first section and the second section;
   an elastic member, one end of the elastic member fixed to the second section, the other end of the elastic member fixed to the sliding member; and
   wherein when the sliding member slides relative to the second section and drives the connecting plate to rotate, the rotary plate rotates relative to the second section and causes the first section to move and rotate relative to the second section into a tilted orientation.

2. The sliding module as claimed in claim 1, wherein the rotary plate includes a first hinged portion at one side thereof, the first section includes a pivot seat, and the first hinged portion is connected to the pivot seat.

3. The sliding module as claimed in claim 2, wherein the rotary plate includes a second hinged portion formed at an opposite side of the first hinged portion, the second section includes a pair of hinge tabs, and the second hinged portion is connected to the pair of hinge tabs.

4. The sliding module as claimed in claim 1, wherein a guiding slot is defined in the sliding member, a block is formed on one end of the connecting plate for slidably being received in the guiding slot.

5. The sliding module as claimed in claim 4, wherein a pivot hole is defined at the other end of the connecting plate, the second section defines a receiving hole, the pivot hole and the receiving hole are connected with a pivot shaft to rotatably connect the connecting plate to the second section.

6. An electronic device comprising:
   a first section;
   a second section;
   a sliding member rotatably connected to the first section;
   a connecting plate slidably connected to the sliding member, and rotatably connected to the second section;
   a rotary plate respectively rotatably connected to the first section and the second section;
   an elastic member elastic member connecting the second section to the sliding member for driving the sliding member to slide relative to the second section; and
   wherein when the sliding member slides relative to the second section and drives the connecting plate to rotate, the rotary plate rotates relative to the second section and causes the first section to move and rotate relative to the second section in a tilted orientation.

7. The electronic device as claimed in claim 6, wherein the rotary plate includes a first hinged portion at one side thereof, the first section includes a pivot seat, and the first hinged portion is connected to the pivot seat.

8. The electronic device as claimed in claim 7, wherein the rotary plate includes a second hinged portion formed at an opposite side of the first hinged portion, the second section includes a pair of hinge tabs, and the second hinged portion is connected to the pair of hinge tabs.

9. The electronic device as claimed in claim 7, wherein a guiding slot is defined in the sliding member, a block is formed on one end of the connecting plate for slidably being received in the guiding slot.

10. The electronic device as claimed in claim 9, wherein a pivot hole is defined at the other end of the connecting plate, the second section defines a receiving hole, the pivot hole and the receiving hole are connected with a pivot shaft to rotatably connect the connecting plate to the second section.

* * * * *